US012580466B2

(12) United States Patent
Rauch et al.

(10) Patent No.: US 12,580,466 B2
(45) Date of Patent: Mar. 17, 2026

(54) ROTARY MAGNET

(71) Applicant: SVM Schultz Verwaltungs-GmbH & Co. KG, Memmingen (DE)

(72) Inventors: Florian Rauch, Bad Grönenbach (DE); Claus Peter Hasel, Memmingen (DE); Karin Kohler, Aitrach (DE)

( * ) Notice: Subject to any disclaimer, the term of this patent is extended or adjusted under 35 U.S.C. 154(b) by 236 days.

(21) Appl. No.: 18/356,861

(22) Filed: Jul. 21, 2023

(65) Prior Publication Data

US 2024/0039383 A1 Feb. 1, 2024

(30) Foreign Application Priority Data

Jul. 29, 2022 (DE) .......................... 102022119118.4

(51) Int. Cl.
H02K 33/16 (2006.01)
H02K 11/21 (2016.01)

(52) U.S. Cl.
CPC ............. H02K 33/16 (2013.01); H02K 11/21 (2016.01)

(58) Field of Classification Search
CPC ................................ H02K 26/00; H01F 7/145
See application file for complete search history.

(56) References Cited

U.S. PATENT DOCUMENTS 3,001,092 A * 9/1961 Nemeth .................. H02K 7/065
74/156
4,691,135 A * 9/1987 Sogabe ................... H01F 7/145
310/216.096

4,899,073 A * 2/1990 Takeuchi ................ H01F 7/145
310/116
5,115,158 A 5/1992 Vaillant de Guelis et al.
7,880,410 B2 * 2/2011 Mohler .................. H02K 33/00
318/159

(Continued)

FOREIGN PATENT DOCUMENTS

CH 583475 12/1976
DE 1289902 B 2/1969
GB 1200109 7/1970

(Continued)

OTHER PUBLICATIONS

18356861_2025-05-09_WO_2022083807_A1_H.pdf (Year: 2025).*

(Continued)

*Primary Examiner* — Christopher M Koehler
*Assistant Examiner* — Ahmed F Seck
(74) *Attorney, Agent, or Firm* — Scheef & Stone, L.L.P.; Keith C. Rawlins, Esq.

(57) ABSTRACT

A bistable rotary magnet is proposed, comprising a rotor, wherein the rotor comprises a permanent magnet having differently polarized magnetic poles opposed with respect to the axis of rotation, wherein the stator comprises two pole shoes extending along the axis of rotation, wherein the permanent magnet includes a first pole surface and a second pole surface at each magnetic pole and each of the two pole shoes includes a first pole surface and a second pole surface, wherein in the first end position the first pole surfaces of the permanent magnet are aligned in parallel to the adjacent first pole surfaces of the pole shoes and in the second end position the second pole surfaces of the permanent magnet are aligned in parallel to the adjacent second pole surfaces of the pole shoes.

10 Claims, 7 Drawing Sheets

(56) References Cited

U.S. PATENT DOCUMENTS

| | | |
|---|---|---|
| 2003/0184186 A1 | 10/2003 | Fukushima et al. |
| 2007/0247264 A1 | 10/2007 | Yonnet et al. |

FOREIGN PATENT DOCUMENTS

| | | | | |
|---|---|---|---|---|
| GB | 1200109 A | * | 7/1970 | ............... G08B 5/24 |
| WO | WO-2022083807 A1 | * | 4/2022 | ............ F02M 57/02 |

OTHER PUBLICATIONS

Official Action issued for GB2308497.3 dated Nov. 10, 2023; 5 pgs.
Official Action issued for GB2308497.3 dated Oct. 1, 2024; 2 pgs.
Foreign Communication for German Patent Application No. 10 2022 119 118.4, German Office Action, 9 pages.

* cited by examiner

II - II

III - III

ROTARY MAGNET

CROSS-REFERENCE TO RELATED APPLICATIONS

This non-provisional application claims the benefit of, and priority to, German Application No. 10 2022 119 118.4, entitled Rotary Magnet, filed on Jul. 29, 2022, which is incorporated by reference in its entirety.

FIELD OF THE DISCLOSURE

The present disclosure generally relates to a rotary magnet, and more particularly to a bistable rotary magnet.

BACKGROUND

Electromagnetic drives, such as bistable rotary magnets, are known from practice. Bistable rotary magnets comprise a stator, an electromagnet, and a rotor having a permanent magnet. Such rotary magnets are drives based on the electromagnetic principle, in which a rotational movement takes place instead of a lengthwise or longitudinal movement (linear magnets).

Bistable rotary magnets sometimes require a large assembly space, however, and are therefore not usable in surroundings in which assembly space is critical. For example, an arrangement of pole shoes and permanent magnet in the axial direction adjacent to one another requires a large assembly space. Bistable rotary magnets are moreover sometimes complexly constructed, which can result in high production costs and susceptibility to error in the assembly. The previous disadvantageous susceptibility to failure because of a lack of adequate robustness and operation is also related to the complex structure. This is because bistable rotary magnets can have restricted suitability for harsh environmental conditions, such as vibrations, impacts, and/or extreme temperatures. Bistable rotary magnets can also be designed inadequately small due to structure, wherein functions have had to be omitted up to this point with smaller design. Therefore, previous bistable rotary magnets were unsuitable, for example, for use in aerospace either due to their small functional scope, their unreliable operation, and/or due to their large dimensions.

SUMMARY

Disclosed is a bistable rotary magnet, including a stator and a rotor rotatable around an axis of rotation, wherein the rotor includes a rotor shaft and a bar-shaped permanent magnet connected thereto in a rotationally fixed manner, having differently polarized magnetic poles opposed with respect to the axis of rotation, wherein the stator includes two pole shoes extending along the axis of rotation, wherein the bar-shaped permanent magnet is adjustable between the pole shoes alternately between a first end position and a second end position, wherein the bar-shaped permanent magnet includes a first pole surface and a second pole surface at each magnetic pole and each of the two pole shoes includes a first pole surface and a second pole surface, wherein in the first end position the first pole surfaces of the permanent magnet are aligned in parallel to the adjacent first pole surfaces of the pole shoes and in the second end position the second pole surfaces of the permanent magnet are aligned in parallel to the adjacent second pole surfaces of the pole shoes; and a coil for conducting electric current, wherein the coil is arranged between the pole shoes on a yoke.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
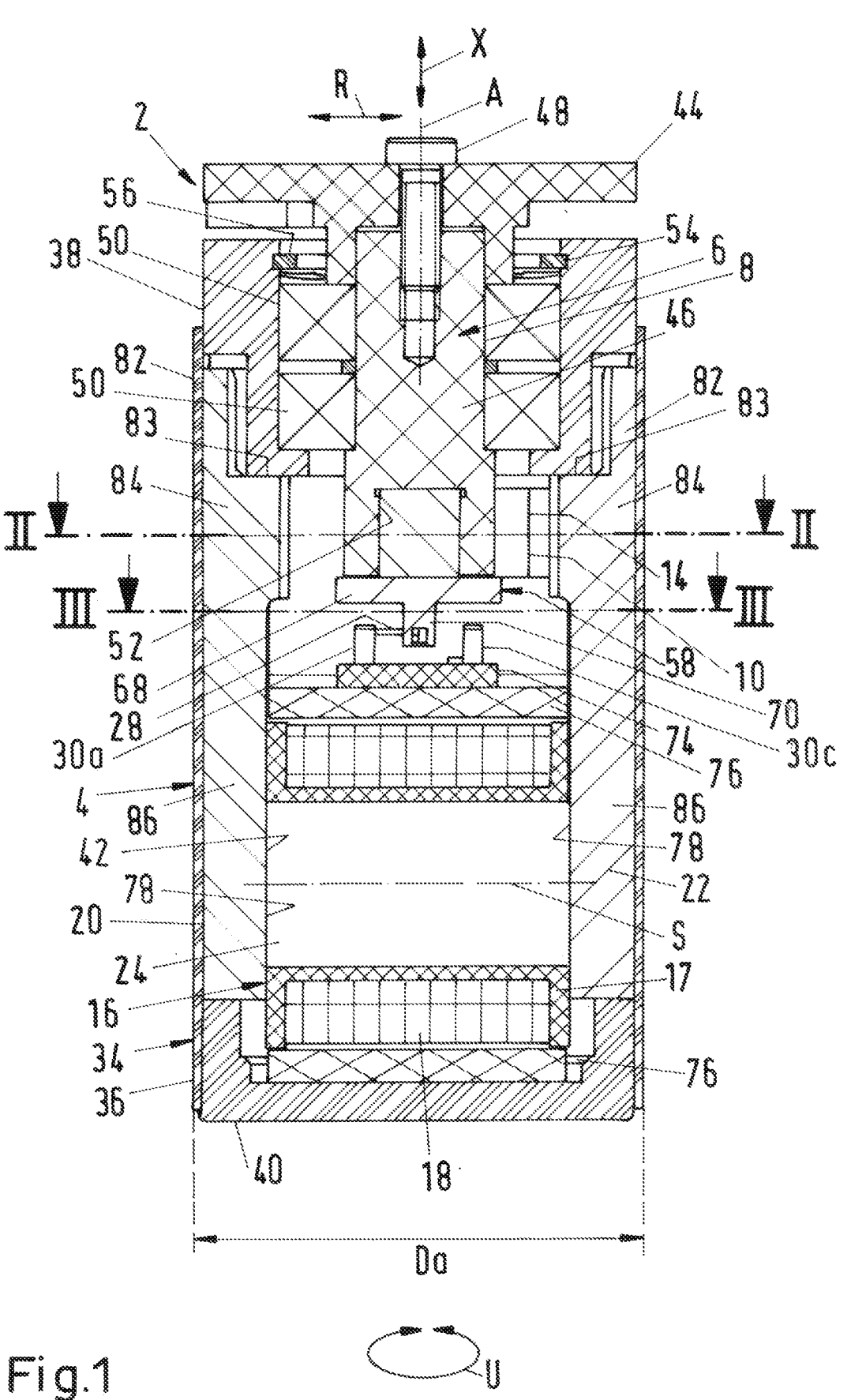
FIG. 1 shows a longitudinal sectional view of a rotary magnet.

A magnetic south pole arises at one of the pole shoes and a magnetic north pole arises at the other one due to a brief energizing of the coil by a first polarization. If the permanent magnet arranged rotatably around the axis of rotation between the pole shoes stands with its magnetic north pole at the pole shoe having magnetic north pole, this attempts to move to the pole shoe having magnetic south pole. This magnetic force causes the rotational movement of the rotor. If the corresponding end position is reached, the permanent magnet holds the respective end position due to the magnetic attraction to the adjacent pole shoe even with deenergized coil. If the coil is now energized again and polarized counter to the above-described energizing (second polarization), the rotor will be rotated in the described manner into the starting position or other end position. The permanent magnet also holds the corresponding end position there due to the magnetic attraction to the adjacent pole shoe. A bistable rotary magnet is therefore provided.

The pole shoes extend along the axis of rotation and form an intermediate space between them. The axis of rotation protrudes through this intermediate space. The permanent magnet is arranged and rotatable around the axis of rotation in this intermediate space. Pole shoes and permanent magnet are therefore arranged adjacent to one another in the radial direction (with respect to the axis of rotation). The rotary magnet according to the disclosure can be designed particularly compactly due to this arrangement and therefore requires a small assembly space, in particular a small assembly height and a small external diameter. The yoke, around which the coil is arranged, is also arranged in this intermediate space. The coil longitudinal axis is therefore perpendicular to the axis of rotation. The yoke can be an iron yoke.

The pole surfaces aligned in parallel to one another in the end positions have the result that the magnetic field lines exiting perpendicularly therefrom or entering perpendicularly therein result in a maximum torque with deenergized and energized coil. An existing assembly space can thus be designed as optimally as possible and/or the rotary magnet can be designed as small as possible.

Each first pole surface of the permanent magnet is assigned a single one of the first pole surfaces of the pole shoes and vice versa. Likewise, each second pole surface of the permanent magnet is assigned a single one of the second pole surfaces of the pole shoes and vice versa. Each pole surface of the permanent magnet can therefore form a pole surface pair with its assigned pole surface of the pole shoe. It is conceivable that each of the two end positions are assigned two pole surface pairs, wherein these two pairs can then apply the holding force. It is conceivable that in each of the two end positions, each two pole surface pairs have (first/second) pole surfaces aligned in parallel to one another. Each of the two end positions is thus secured by two pole surface pairs. In the first end position, the first pole surfaces are arranged adjacent to one another and in the second end position, the second pole surfaces are arranged adjacent to one another.

Each of the pole surfaces can be aligned in the circumferential direction. The first pole surface of the first pole shoe can therefore be opposite to the second pole surface of the second pole shoe, for example along the circumferential direction. Both pole surfaces can also be arranged at both ends of a free rotational range for the permanent magnet. These two surfaces can therefore delimit the free rotational range for the permanent magnet. Moreover, the second pole surface of the first pole shoe can be opposite to the first pole surface of the second pole shoe, for example along the circumferential direction. Both pole surfaces can therefore also be arranged at both ends of a free rotational range for the permanent magnet. These two surfaces therefore also delimit the corresponding free rotational range for the permanent magnet. The pole surfaces of the pole shoes can be arranged at axial height of the permanent magnet. For reasons of reducing the number of parts and small design, the pole shoes can be clamped by the housing, for example by the housing cover and housing base.

The bar shape of the permanent magnet also enables a compact design, since such a permanent magnet has magnetic poles which are sufficiently far apart from one another to bring them into the vicinity of pole shoes, and at the same time are defined on both sides by two angle ranges of 180° each, in which it can be moved between the two end positions in order to enable large rotational angles.

Overall, the rotary magnet according to the disclosure therefore has a robust design and a high level of reliability, even in harsh environmental conditions. Moreover, it can be embodied very small, because of which it is suitable for aerospace applications.

According to a further conceivable design of the rotary magnet according to the disclosure, the permanent magnet can be a parallel anisotropic permanent magnet. Parallel anisotropic permanent magnets are magnetized in a specified direction and can therefore generate a strong holding force. The permanent magnet can therefore be, for example, a NdFeB, SmCo, ferrite, and AlNiCo magnet. This strong holding force favours the structural size reduction, since now a rotary magnet having equal or improved properties can be constructed smaller.

According to a further conceivable design of the rotary magnet according to the disclosure, the pole surfaces can be designed as planar. Large surfaces are therefore provided which are traversed perpendicularly by the magnetic field lines in an end position, wherein all of these magnetic field lines can advantageously extend in parallel to one another.

According to a further conceivable design of the rotary magnet according to the disclosure, the rotor shaft can carry the permanent magnet. The permanent magnet can therefore be fastened on the rotor shaft, wherein the rotor shaft can be integrally formed, thus can consist of one piece, and is not joined from multiple parts. This embodiment results in a reduction of required components, in particular the direct fastening of the permanent magnet on the rotor shaft, for example in a fixing channel. The fastening of the permanent magnet on the rotor shaft, for example in the fixing channel, can take place, for example, by an adhesive bond, a screw connection, or a clamp connection. In aspects, the last connection is especially suitable for reducing required components and saving assembly space.

According to a further conceivable design of the rotary magnet according to the disclosure, the coil can comprise a winding carrier, for example made of plastic such as a thermoplastic. The winding carrier can then carry the windings, wherein this embodiment is used for a modular design. This is because the coil can then be designed independently of the yoke in principle since the winding is not wound on the yoke itself here. The winding carrier can press against the pole shoes to fix the coil in the radial direction.

According to a further conceivable design of the rotary magnet according to the disclosure, the pole shoes can each form a contact surface, against which the winding carrier can press. The contact surfaces can be designed as planar. Advantageous fixing of the coil in the radial direction is thus implemented, wherein in this way assembly space can be saved and further components for dedicated radial securing can be omitted. It is conceivable that the two contact surfaces are diametrically opposite with respect to the axis of rotation, so that the winding carrier can be held securely from both sides.

According to a further conceivable design of the rotary magnet according to the disclosure, the stator can be formed in two parts, wherein it comprises the two pole shoes or is formed therefrom. The two pole shoes can be separate components and can be spatially and/or structurally separated from one another. The pole shoes can be connected to one another by the yoke in a magnetically advantageous manner.

According to a further conceivable design of the rotary magnet according to the disclosure, it can comprise a housing which has an external diameter or a transverse extension in the range of 6 mm to 10 mm. The external diameter/the transverse extension can be the maximum external diameter/the maximum transverse extension. Larger external diameters/transverse extensions are conceivable; however, such small designs, for example for aerospace applications, by the rotary magnet according to the disclosure are suitable and are made possible at all for the first time. A cylindrical housing has a diameter; a polygonal, for example rectangular housing has a transverse extension, thus a width between two sides through the axis of rotation. The housing can comprise a peripheral housing sleeve and/or a housing cover and/or a housing base. Housing cover and housing base can be connected to the housing sleeve. Housing sleeve, housing cover, and/or housing base can be manufactured from nonmagnetic material so as not to negatively influence the magnetic force of the rotary magnet.

For reasons of reducing the number of parts and small design, the housing cover can include bearings for mounting the rotor shaft and/or an inner circumferential groove for receiving a lock ring. The lock ring can secure the bearings in the axial direction. The housing sleeve can be manufactured from nonmagnetic material; the housing cover and/or the housing base can be manufactured from nonmagnetic material. Due to a small distance to the pole shoes, for example with small designs, nonmagnetic materials are particularly suitable so as not to negatively influence the magnetic force of the rotary magnet.

For reasons of reducing the number of parts and small design, the pole shoes can be clamped by housing cover and housing base. The pole shoes are thus clamped in between.

According to a further conceivable design of the rotary magnet according to the disclosure, the pole shoes can each extend over an angle range in the range from 60° to 90°, alternatively 75°, at the axial height of the permanent magnet. A free rotational range between the pole shoes is thus created which permits a sufficiently large rotational range for the rotor or permanent magnet.

According to a further design of the rotary magnet according to the disclosure, the permanent magnet can be designed as trapezoidal or triangular at the end sides. These end sides form the differently polarized magnetic poles having the pole surfaces of the permanent magnet. Alternatively or additionally, the pole surfaces of the permanent magnet can each enclose an acute angle with a permanent magnet longitudinal axis. These shapes or angles can be present in a cross section with respect to the axis of rotation. They significantly simplify the design and reduce production costs, since the lateral flattening of the bar-shaped permanent magnet has the result that the pole shoes can have large internal angles in cross section at least at the axial height of the permanent magnet and sharp edges (with small internal angles), which are sometimes producible with great difficulty or not at all, can be avoided on the pole shoes, in particular in very small designs. The large internal angles can be in the range from 100° to 160°, alternatively between 120° and 140°. This is because the permanent magnet and the pole shoes can be dependent on one another in construction due to the parallel pole surfaces. Moreover, by the trapezoidal or triangular shape or the acute angle, an advantageous tangential force acts on the permanent magnet and rotor, wherein in combination with the bar magnet shape and the lever arm between corresponding magnetic pole and axis of rotation, this can result in an advantageous torque formation. The trapezoidal shape can be an equilateral trapezoidal shape, wherein an imbalance is advantageously avoided, and a long service life is implemented here.

According to a further design of the rotary magnet according to the disclosure, a largest-diameter imaginary rotational circle, on which the permanent magnet can move, can extend through the two pole shoes. The two pole shoes can therefore be arranged even closer to the axis of rotation in the radial direction with respect to the axis of rotation. The rotational circle can be aligned centrally with respect to the axis of rotation. The distal end faces, for example with trapezoidal end sides, or distal end edges, for example with triangular end sides, can lie on the rotational circle.

According to a further design of the rotary magnet according to the disclosure, it can comprise a mechanical rotational angle limit stop for the rotor. The rotational angle limit stop alternatively comprises a stop recess, extending in the circumferential direction with respect to the axis of rotation, having at least one stop surface and at least one stop pin arranged in the stop recess, wherein one of stop recess and stop pin is arranged rotationally fixed with the rotor and one thereof is arranged housing fixed. The stop pin can press against the stop surface in a stop position and prevent further rotation. Stop recess and stop pin are therefore movable in relation to one another. The rotational angle limit stop is used to set a minimum and/or maximum rotational angle/rotational range and/or to fix at least one of the end positions. Moreover, magnetic adhesion between permanent magnet and pole shoe(s) can thus be reliably prevented in that an air gap remains between the adjacent pole surfaces in each stop position. The stop recess can advantageously have the form of a circular ring sector in cross section with respect to the axis of rotation and can have two opposing stop surfaces. It is thus possible to correspond to the rotational movement of the rotor in the best possible manner. It is conceivable that the stop recess is arranged on the rotor, for example on a rotor disc. In some aspects, the stop recess is on the outer circumferential side of a rotor disc. The rotor disc can be connected to the rotor shaft in a rotationally fixed manner, for example, the two are screwed together with one another. It is conceivable that the stop pin protrudes along the axis of rotation and/or is arranged on a housing or the housing cover. In aspects, the stop pin is formed integrally thereon. This embodiment results in a low complexity and highly secure construction using few components. This embodiment is therefore even made possible for very small designs. The rotor disc can be used to transmit the rotational movement generated by the rotary magnet to a component external to the rotary magnet.

According to a further design of the rotary magnet according to the disclosure, the rotary magnet can be designed to apply force to the permanent magnet in the direction of one of the end positions, for example in pulsed operation, due to the energizing of the coil. The magnetic repulsion between the pole shoes and the permanent magnet results in the rotational movement of the permanent magnet and thus also of the rotor around the axis of rotation. A bistable rotary magnet having pulsed operation can therefore advantageously be created. In the deenergized state of the coil, the permanent magnet in conjunction with the respective magnetic field of the pole shoes holds the corresponding end position in a bistable manner or in both end positions. Electrical energy therefore does not have to be supplied. If the other end position is to be assumed, only an electrical pulse for the coil is thus sufficient for the repulsion of the permanent magnet from the adjacent pole shoe. This has multiple advantages. On the one hand, the pulsed operation uses very little energy, which is of great advantage for aerospace applications. Moreover, the pulsed operation prevents a sometimes disadvantageous heating of the rotary magnet. Moreover, this embodiment is used for a very small design.

According to a further design of the rotary magnet according to the disclosure, it can include an end position sensor, comprising a contact spring, connected to the rotor shaft in a rotationally-fixed manner, having at least one spring arm and at least one contact pin, against which the at least one spring arm can press. The contact pin can be fixed in place, for example fixed in place with respect to the stator. The contact pin can certainly alternatively also be rotationally fixed with the rotor shaft and the contact spring can be fixed in place, for example fixed in place with respect to the stator. By means of the end position sensor, reaching one of the end positions after rotation of the rotor is thus enabled and/or leaving one of the end positions during rotation of the rotor is enabled. The contact spring(s) and the contact pin(s) can each be manufactured from an electrically conductive material, for example from spring steel, spring bronze, and can be part of an electrical circuit. The contact spring(s) and/or the contact pin(s) can, in some aspects, include a gold coating.

The gold coating results in very good electrical conductivity and is used for corrosion protection.

A contact between contact spring and contact pin can close a circuit which detects the presence of a corresponding end position. A released contact between contact spring and contact pin interrupts a circuit, which detects leaving a corresponding end position. This spring-based end position sensor has significant advantages over known sensors. A reed contact, for example, is very disadvantageous due to the large assembly space occupied thereby and is therefore not usable here. Eddy current sensors or Hall sensors are also not usable, since they cannot sense sufficiently precisely in small assembly spaces. The end position sensor according to the disclosure, however, can be built very small and is moreover failsafe due to its low complexity design.

However, the contact spring can also result in a further advantage. Adjusting a magnetic holding force in an end position was heretofore possible hardly at all or only very cumbersomely. However, influence can now be taken by the contact spring in a simple manner on the magnetic holding force or the holding torque in the deenergized state of the coil and the air gap between the adjacent pole surfaces in the end positions. Such adjustability is now enabled even with very small designs.

According to a further conceivable design of the rotary magnet according to the disclosure, the at least one spring arm can be aligned perpendicularly to the axis of rotation. In some aspects, all spring arms are aligned perpendicularly to the axis of rotation. The at least one spring arm can thus be moved on a circular movement path, which is large enough to be able to detect end positions securely.

According to a further conceivable design of the rotary magnet according to the disclosure, the contact spring can be designed to achieve a horizontal magnetic force characteristic curve at least in sections. A constant torque can thus be enabled over the entire rotational range of the rotor. The contact spring can be adapted for this purpose with respect to material and/or spring arm length and/or a spring arm thickness and/or spring arm height, wherein it has been shown that a horizontal magnetic force characteristic curve is achievable very easily and very accurately via the design of the contact spring. Moreover, the launching behaviour of the contact spring from the corresponding contact pin and thus also the repulsion of the permanent magnet from the pole shoe may be influenced via a suitable design of the contact spring.

According to a further design of the rotary magnet according to the disclosure, the contact spring can comprise four spring arms. The spring arms can extend in different radial directions with respect to the axis of rotation, due to which they can be moved on sufficiently large movement paths to be able to reliably detect end positions. The spring arms can advantageously have equal lengths, due to which bending lines of the spring arms of equal lengths may be implemented upon contact on the contact pin. All spring arms can thus be identically strained and worn, which lengthens a service life and avoids incorrect sensing. Four end position contacts can thus advantageously be formed, by which the sensor reliability is improved, and the sensor accuracy is increased.

According to a further conceivable design of the rotary magnet according to the disclosure, the contact spring can be designed as H-shaped, wherein each of the two stems of the H-shape (in the typographical meaning) form two of the spring arms. Therefore, the H-shape enables four spring arms. The contact springs can be designed as H-shaped viewed in longitudinal section, wherein this alignment is advantageous due to the bending capability of the spring arms then present in the circumferential direction. Additionally or alternatively, the contact springs can be designed as X-shaped viewed in cross section, wherein this design is used to extend the spring arms in different radial directions with simultaneous centring of the contact spring with respect to the axis of rotation. Each of the two diagonals (in the typographical meaning) of the X-shape forms two of the spring arms, originating at the intersection of the two diagonals. The X-shape therefore also enables four spring arms. The X-shape also enables the spring arms to each be able to have sufficiently large angular distances from one another. In some aspects, adjacent spring arms of the X-shape contact spring have an angular distance in the range of 90° to 50°, alternatively of 70°, wherein the secondary angle (in the mathematical meaning) can accordingly be matched to 180° or results. These angle ranges have proven to be sufficiently secure for unambiguous sensing and moreover permit the largest possible movement space for the rotor. The contact spring can be integrally formed, due to which it is more stable and joining of individual parts is avoided, which sometimes is either very costly or complex or even impossible in very small designs. Moreover, an integral contact spring is significantly easier to install, due to which the assembly process is simplified and made error proof.

According to a further conceivable design of the rotary magnet according to the disclosure, the contact spring can thus be designed as H-shaped in longitudinal section and designed as X-shaped in cross section. The advantages of the H-shape and X-shape may therefore be combined particularly advantageously. The X-shape thus has the result that the spring arms can enclose an angle with a base of the contact spring (viewed in longitudinal section), wherein this base is formed by the cross stroke (in the typographical meaning) of the H-shape. Each of the spring arms can protrude from the cross stroke, by which force can be applied uniformly to each of the spring arms. The H-shape from the one spatial direction thus provides a base to the X-shape from the other spatial direction in a manner which saves assembly space and simplifies geometry, in relation to which the spring arms can be tensioned in the circumferential direction. It is therefore also conceivable that the spring arms can be pre-tensioned in relation to the base in the circumferential direction by holding channels in a holding mandrel, by which the contact springs can be clamped in a formfitting and/or friction-locked manner. The base and/or the spring arms can be designed as rectangular (e.g., in cross section and/or longitudinal section) and/or planar (e.g., in cross section and/or longitudinal section). This simplifies the geometry, the producibility, and the (pre-)assembly process.

According to a further conceivable design of the rotary magnet according to the disclosure, the spring arm(s) can have a length in the range of 1 mm to 1.5 mm. Greater lengths are certainly also fundamentally conceivable, but such short spring arms are sufficiently suitable and enabled at all for the first time, for example for aerospace applications, by the rotary magnet according to the disclosure.

According to a further conceivable design of the rotary magnet according to the disclosure, the contact spring can be fastened on a spring holder. The spring holder can be a separate component, thus cannot form the section of another integral component. The contact spring can thus form an assembly with the spring holder, which can already be preinstalled before the assembly of the rotary magnet, due to which the assembly process is simplified and becomes error proof. It is conceivable that the spring holder is fastened at the end side on the rotor shaft, due to which an assembly space optimization can take place. Thus, for example, an assembly space in the axial direction between permanent magnet and coil can be utilized, which can be present in any case to prevent or at least reduce possible magnetic influences between the coil and the permanent magnet. The spring holder can include a disc base and a holding mandrel protruding therefrom in the axial direction and centrally with respect to the axis of rotation. The disc base can press against the rotor shaft and/or be fastened there. The holding mandrel can hold the contact spring. It is therefore conceivable that the holding mandrel includes two holding channels extending in different radial directions (with respect to the axis of rotation), in which the contact spring is held.

According to a further conceivable design of the rotary magnet according to the disclosure, the spring holder can fix the permanent magnet on the rotor shaft. For this purpose, the rotor shaft can include a fixing channel extending in the radial direction (with respect to the axis of rotation), in which the permanent magnet is arranged and fixed via spring holder. The spring holder can terminate the fixing channel on the axial side. This results in a reduction of the number of parts and enables a small design.

According to a further design of the rotary magnet according to the disclosure, the end position sensor can include four contact pins, wherein a single one of the four spring arms can be assigned to each of the contact pins. Each of the spring arms can therefore press against only a single one of the contact pins. Vice versa, each of the contact pins can therefore also be contacted by only a single one of the spring arms. This embodiment thus significantly lengthens the service life and increases sensor reliability. Each of the contact pins can form a contact pair with its assigned spring arm. It is conceivable for redundancy reasons that each of the two end positions is assigned two contact pairs. It is conceivable for reasons of uniform stress, to protect bearings, that in each of the two end positions, two contact pins and two spring arms contact. Therefore, each of the end positions can be sensed by two contacts in the normal case. Even for the case that one of the contact pairs may fail, the other contact pair can still sense the corresponding end position. Both end positions can thus be sensed reliably and switching points can be ensured. This embodiment moreover lengthens the service life of the rotary magnet and in particular the contact spring in that alternating bending stresses are avoided. Since in some aspects each of the spring arms is only subjected to force against an assigned contact pin, a bending of the spring arm takes place in the same direction upon each contact. The spring arm is therefore never bent in the other direction.

According to a further conceivable design of the rotary magnet according to the disclosure, the contact pins can have equal radial distances from the axis of rotation. A uniform bending line of the spring arms and a uniform contact upon contact on the corresponding contact pin is thus also implemented to lengthen the service life and for reliable sensing.

According to a further conceivable design of the rotary magnet according to the disclosure, the contact spring can be manufactured from a flat material, for example from a strip material. The flat material is particularly suitable, since in this way shaping, for example by bending, for example to produce the X-shape, is implementable easily and cost-effectively.

According to a further design of the rotary magnet according to the disclosure, the contact spring can be arranged or designed in such a way that it is pre-tensioned in at least one of the two end positions by the magnetic field between permanent magnet and corresponding pole shoe. The magnetic field between corresponding pole shoe and permanent magnet holds the rotor in one end position and the contact spring presses against a corresponding contact pin with at least one spring arm in the end position and is pre-tensioned there. This pre-tension, the force of which is directed against the holding force of the magnetic field, can advantageously be used to accelerate switching of the rotor into the other end position upon energizing of the coil. This is because the spring pre-tension assists the repulsion of the permanent magnet from the pole shoe and the launching of the contact spring from the corresponding contact pin.

According to a further conceivable design of the rotary magnet according to the disclosure, the pole shoes can each comprise three sections. These sections can directly adjoin one another in the axial direction. A first section can be designed as a shoulder section, which can form an axial shoulder, against which the housing cover can support itself, for example. A second section, which can be arranged adjacent to the first section, can be designed as a pole surface section, which forms the pole shoe-side pole surfaces. A third section, which can be arranged adjacent to the second section, can be designed as a contact surface section, which forms the contact surfaces for the winding carrier. Pole shoes which have a high level of functional integration are implementable by this embodiment. It is conceivable that the first and third sections are arranged in the respective axial end areas of the pole shoes to save assembly space.

Production is to be understood as a procedure by which a component is manufactured. Preassembly is to be understood as a procedure by which at least two components are connected to one another to form an assembly. Assembly is to be understood as a procedure by which components or assemblies are secured at or in their intended location for operation, and the rotary magnet as such is completely manufactured. After assembly, the rotary magnet as such is to be complete.

In the figures, identical or corresponding elements are each designated by the same reference sign and are therefore not described again if it is not expedient. Features already described are not described again to avoid repetitions and are applicable to all elements having identical or corresponding reference signs, if not explicitly precluded. The disclosures contained in the entire description are accordingly transferable to identical parts having identical reference signs or identical component designations. The position specifications selected in the description, such as above, below, lateral, etc. also relate to the figure immediately described and shown and are to be transferred accordingly to the new position in the event of a position change. Furthermore, individual features or combinations of features from the different exemplary embodiments shown and described can also as such represent solutions which are independent, inventive, or according to the disclosure.

Starting from an axis of rotation A, which extends along an axial direction X through the rotary magnet 2, a radial direction R extends. A circumferential direction U extends around the axis of rotation A.

FIG. 1 shows a rotary magnet 2 according to the disclosure in a longitudinal sectional view. The rotary magnet 2 comprises a housing 34, which comprises a nonmagnetic and cylindrical housing sleeve 36, a nonmagnetic housing cover 38, and a nonmagnetic housing base 40. The maximum external diameter Da is defined here by the housing sleeve 36 and can be 8 mm. Housing cover 38 and housing base 40 are each inserted into the housing sleeve 36. The housing cover 38 is designed as hollow cylindrical for reasons of small installation space requirement and has an inner circumferential groove 54 for receiving a lock ring 56 on the inner circumferential side.

Figure 2:
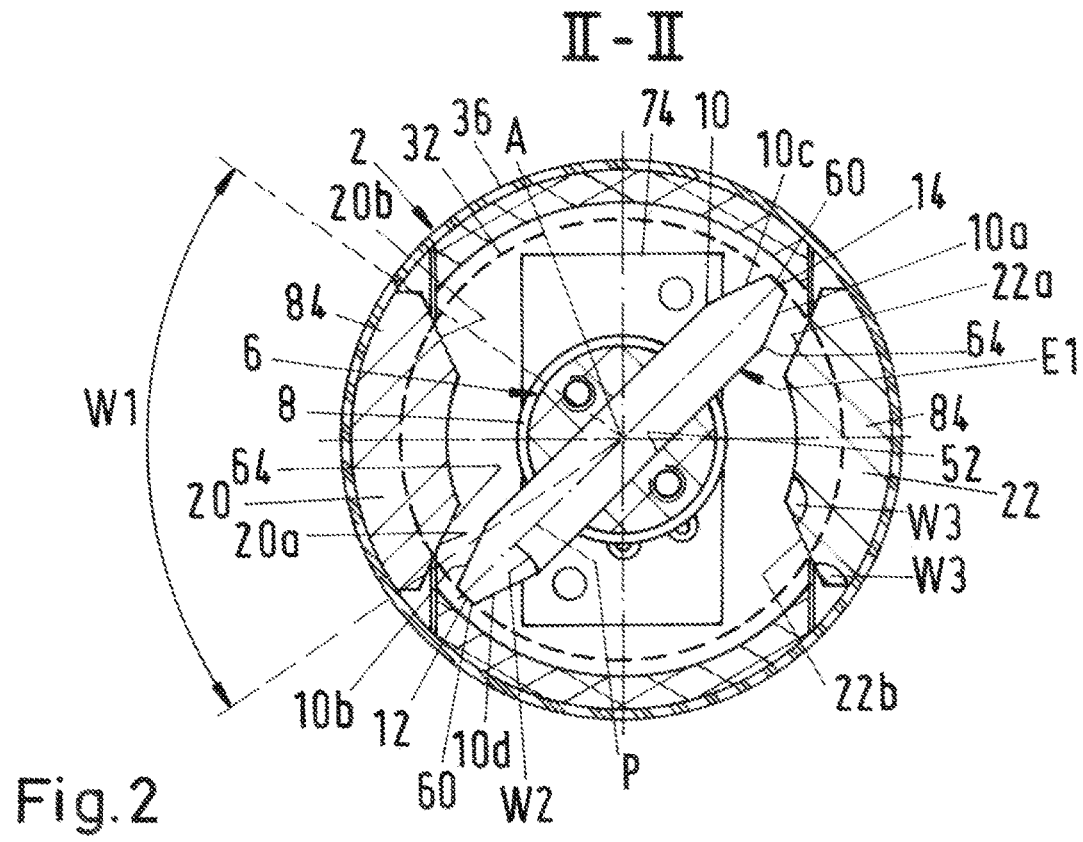
FIG. 2 shows a cross-sectional view of the rotary magnet along line II-II from FIG. 1.

The rotary magnet 2 comprises a stator 4, which is formed in two parts and comprises two pole shoes 20, 22. The two pole shoes 20, 22 extend along the axis of rotation A and are arranged opposite to one another with respect to the axis of rotation A. The two pole shoes 20, 22 therefore form an intermediate space 42 between them. The two pole shoes 20, 22 are separate components but are magnetically connected to one another by a yoke 24 of the rotary magnet 2. Each of the two pole shoes 20, 22 extends with respect to the axis of rotation A and at the axial height of the permanent magnet 10 over an angle range W1 of 75°, as shown in FIG. 2. The first pole shoe 20 includes a first pole surface 20a, which is aligned in the circumferential direction U, and a second pole surface 20b, which is provided on the opposite side of the first pole shoe 20 and is also aligned in the circumferential direction U. The second pole shoe 22 includes a first pole surface 22a, which is aligned in the circumferential direction U, and a second pole surface 22b, which is provided on the opposite side of the second pole shoe 22 and is also aligned in the circumferential direction U.

The first pole surface 20a of the first pole shoe 20 and the second pole surface 22b of the second pole shoe 22 thus delimit a free rotational range for the permanent magnet 10. Moreover, the second pole surface 20b of the first pole shoe 20 and the first pole surface 22a of the second pole shoe 22 also delimit a free rotational range for the permanent magnet 10. The pole surfaces 20a, 20b, 22a, 22b of the pole shoes 20, 22 are designed as planar and are arranged at the axial height of the permanent magnet 10. The pole shoes 20, 22 are clamped by the housing cover 38 and housing base 40.

Each of the two pole shoes 20, 22 includes a first section at one axial end, which is designed as a shoulder section 82. Each shoulder section 82 includes a shoulder 83, against which the housing cover 38 supports itself. Directly adjacent to the first section, each pole shoe 20, 22 includes a second section, which is designed as a pole surface section 84. Each pole surface section 84 forms the corresponding pole shoe-side pole surfaces 20a, 20b, 22a, 22b. Directly adjacent to the second section, each pole shoe 20, 22 includes a third section at the other axial end, which is formed as a contact surface section 86. Each contact surface section 86 forms a planar contact surface 78 for the winding carrier 17.

The rotary magnet 2 moreover comprises a rotor 6 rotatable around the axis of rotation A. The rotor 6 is formed in multiple parts and comprises a rotor disc 44, which is arranged at one end on the rotary magnet and engages partially in the housing cover 38. An integral rotor shaft 46 is screw-connected in a rotationally-fixed manner with the rotor disc 44, wherein by a screw 48, an axial clamping force can be applied to bearings 50, which are clamped between the rotor disc 44 and the rotor shaft 46. The rotor 6 is rotatably mounted in relation to the housing cover 38 by the bearings 50. The lock ring 56 secures the rotor 6 and the bearings 50 in the axial direction X.

At the end side of the rotor shaft 46 opposite to the rotor disc 44, it is provided with a fixing channel 52 extending continuously in the radial direction R. The bar-shaped permanent magnet 10 is arranged in the fixing channel 52 and the axis of rotation A extends centrally through it. The rotor shaft 46 thus carries the permanent magnet 10 in a rotationally-fixed manner and arranges it in the intermediate space 42 radially adjacent to the pole shoes 20, 22. Moreover, at the end side of the rotor shaft 46 opposite to the rotor disc 44, a spring holder 58 is fastened, which fixes the permanent magnet 10 in the fixing channel 52. The spring holder 58 terminates the fixing channel 52 on the axial side.

The permanent magnet 10 is a parallel anisotropic permanent magnet and comprises a magnetic pole at each of its distal end areas or ends 12, 14. The magnetic poles are differently polarized. At each of the two magnetic poles, the permanent magnet 10 includes a first pole surface 10a, 10b and a second pole surface 10c, 10d. The pole surfaces 10a, 10b, 10c, 10d of the permanent magnet 10 are designed as planar. The permanent magnet 10 is designed as an equilateral trapezoid at each of its end sides or at its ends 12, 14, as shown in FIG. 2. The two equal legs of the trapezoid form the pole surfaces 10a, 10b, 10c, 10d. The short trapezoid sides each form a distal end face 60, which lies on an imaginary rotational circle 32. This rotational circle 32 extends through both pole shoes 20, 22 and is the largest diameter rotational circle of the permanent magnet 10. Moreover, it is apparent that the pole surfaces 10a, 10b, 10c, 10d enclose an acute angle W2 with a permanent magnet longitudinal axis P. It is moreover apparent in FIG. 2 that the two pole shoes 20, 22 have large internal angles W3.

The first pole surface 10a of the permanent magnet 10 is assigned to the first pole surface 22a of the second pole shoe 22; these pole surfaces 10a, 22a form a (first) pole surface pair. The first pole surface 10b of the permanent magnet 10 is assigned to the first pole surface 20a of the first pole shoe 20; these pole surfaces 10b, 20a form a (second) pole surface pair. A first end position E1 is shown in FIG. 2, wherein the permanent magnet 10 is held deenergized in this end position E1. In the first end position E1, the first pole surfaces 10a, 10b of the permanent magnet 10 are aligned in parallel to the adjacent first pole surfaces 20a, 22a of the pole shoes 20, 22. An air gap 64 is provided in each case between adjacent pole surfaces 10a/22a and 10b/20a, which is traversed perpendicularly by magnetic field lines, wherein these magnetic field lines extend in parallel to one another. The pole surfaces 10a/22a and 10b/20a aligned in parallel to one another in the first end position E1 have the result that the magnetic field lines exiting therefrom or entering therein extend perpendicular to the pole surfaces, thus in parallel to the surface normals. It is therefore apparent that the first end position E1 is assigned two pole surface pairs which apply the holding force.

If the rotor 6 is now rotated as described around the axis of rotation out of the first end position E1, it reaches a second end position E2. This is shown by way of example in FIG. 6. However, it can also be described on the basis of FIG. 2.

The second pole surface 10c of the permanent magnet 10 is assigned to the second pole surface 20b of the first pole shoe 20; these pole surfaces 10c, 20b form a (third) pole surface pair. The second pole surface 10d of the permanent magnet 20 is assigned to the second pole surface 22b of the second pole shoe 22; these pole surfaces 10d, 22b form a (fourth) pole surface pair. In the second end position E2, the second pole surfaces 10c, 10d of the permanent magnet 10 are aligned in parallel to the adjacent second pole surfaces 20b, 22b of the pole shoes 20, 22. An air gap 64 is provided in each case between adjacent pole surfaces 10c/20b and 10d/22b, which is traversed perpendicularly by magnetic field lines, wherein these magnetic field lines extend in parallel to one another. The pole surfaces 10c/20b and 10d/22b aligned in parallel to one another in the second end position E2 have the result that the magnetic field lines exiting therefrom or entering therein extend perpendicularly to the pole surfaces, thus in parallel to the surface normals.

It is therefore apparent that the second end position E2 is also assigned two pole surface pairs which apply the holding force.

In the first end position E1, the first pole surfaces are arranged adjacent to one another and in the second end position E2, the second pole surfaces are arranged adjacent to one another.

The rotary magnet 2 moreover comprises a coil 16, which includes a winding carrier 17, on which a winding 18 is guided. The winding 18 is used for the optional, pulsed conduction of electric current and the generation of a magnetic field. The coil 16 is arranged in the intermediate space 42 between the pole shoes 20, 22 and on the yoke 24. It is apparent that the coil longitudinal axis S is aligned perpendicularly to the axis of rotation A. The coil 16 is moreover fixed at this point in the axial direction X and radial direction R by a coil holder 76. The coil holder 76 presses on both sides against the pole shoes 20, 22 in the radial direction R and against the housing base 40 in the axial direction X. In addition, the coil carrier 17 presses on both sides in the radial direction R against the planar contact surfaces 78 of the pole shoes 20, 22.

The fundamental adjustment function of the rotary magnet 2 is to be explained briefly hereinafter. Due to a brief energizing or pulse energizing of the coil 16 by a first polarization, a magnetic south pole arises at one of the pole shoes 20, 22 and a magnetic north pole arises at the other of the pole shoes 20, 22. When the permanent magnet 10, which is arranged rotatably around the axis of rotation A between the pole shoes 20, 22, stands with its magnetic north pole at the pole shoe 20, 22 having magnetic north pole, the permanent magnet 10 attempts to move toward the pole shoe 20, 22 having magnetic south pole. This magnetic force causes the rotational movement of the rotor 6. If the corresponding end position E1, E2 is reached, the permanent magnet 10 thus holds the respective end position due to the magnetic attraction to the pole shoes 20, 22, even with deenergized coil 16. If the coil 16 is now energized again and polarized counter to the above-described energizing (second polarization), the rotor 6 is rotated in the described manner into the starting position or other end position E1, E2. The permanent magnet 10 also holds the corresponding end position E1, E2 there due to the magnetic attraction to the pole shoes 20, 22.

Figure 7:
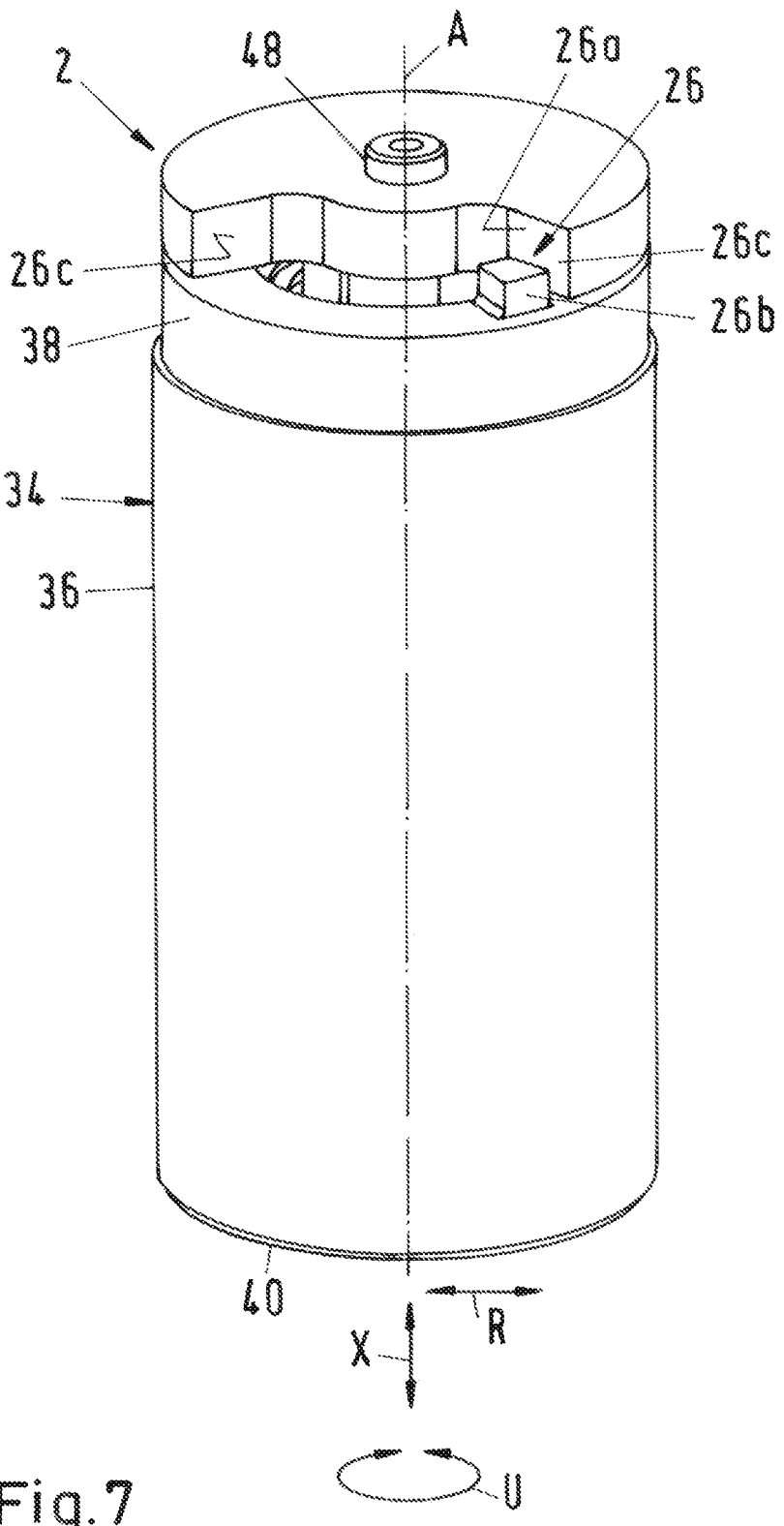
FIG. 7 shows a further perspective view of a rotary magnet.

The rotary magnet 2 moreover comprises a mechanical rotational angle limit stop 26, to define a rotational range of the rotor 6, as shown in FIG. 7. The rotary angle limit stop 26 includes for this purpose a stop recess 26a, which is formed in the rotor disc 44 and extends in the circumferential direction U with respect to the axis of rotation A. The stop recess 26a has the shape of a circular ring sector in cross section and has two opposing stop surfaces 26c. The rotary angle limit stop 26 moreover comprises a stop pin 26b arranged in the stop recess 26a. While the stop recess 26a is rotatable with the rotor 6, the stop pin 26b is fixed in place and in the present example is formed integrally by the housing cover 38. The stop pin 26b presses against one of the stop surfaces 26c in the stop position and prevents a further rotation of the rotor 6. The stop pin 26b protrudes along the axis of rotation A.

The rotary magnet 2 moreover comprises an end position sensor, which is shown in FIGS. 3 to 6. The end position sensor comprises a contact spring 28 rotationally fixed on the rotor 6 and contact pins 30a, 30b, 30c, 30d, which are fixed in place and interact with the contact spring 28.

Figure 3:
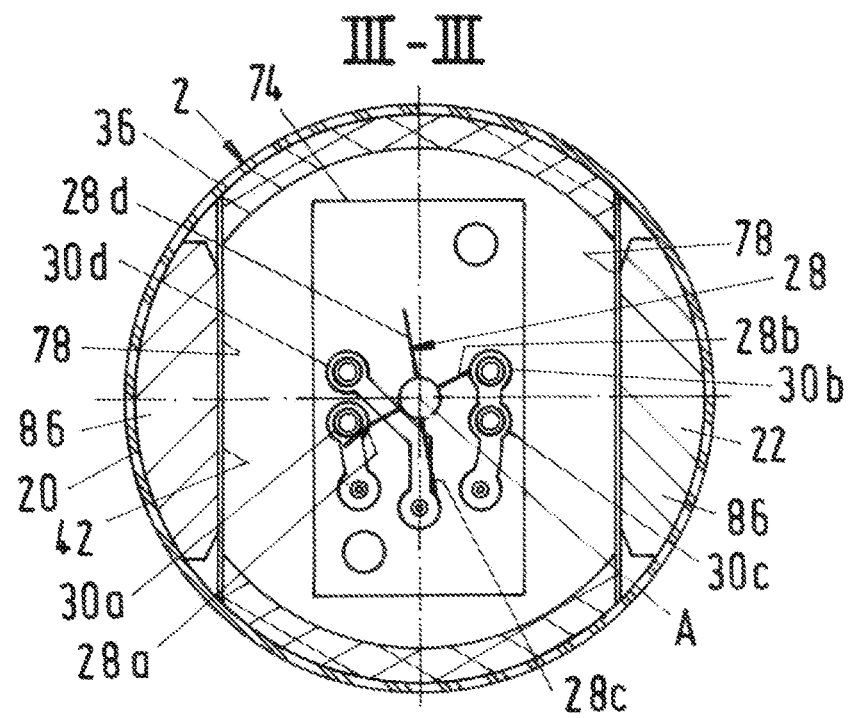
FIG. 3 shows a cross-sectional view of the rotary magnet along line III-III from FIG. 1.
Figure 4:
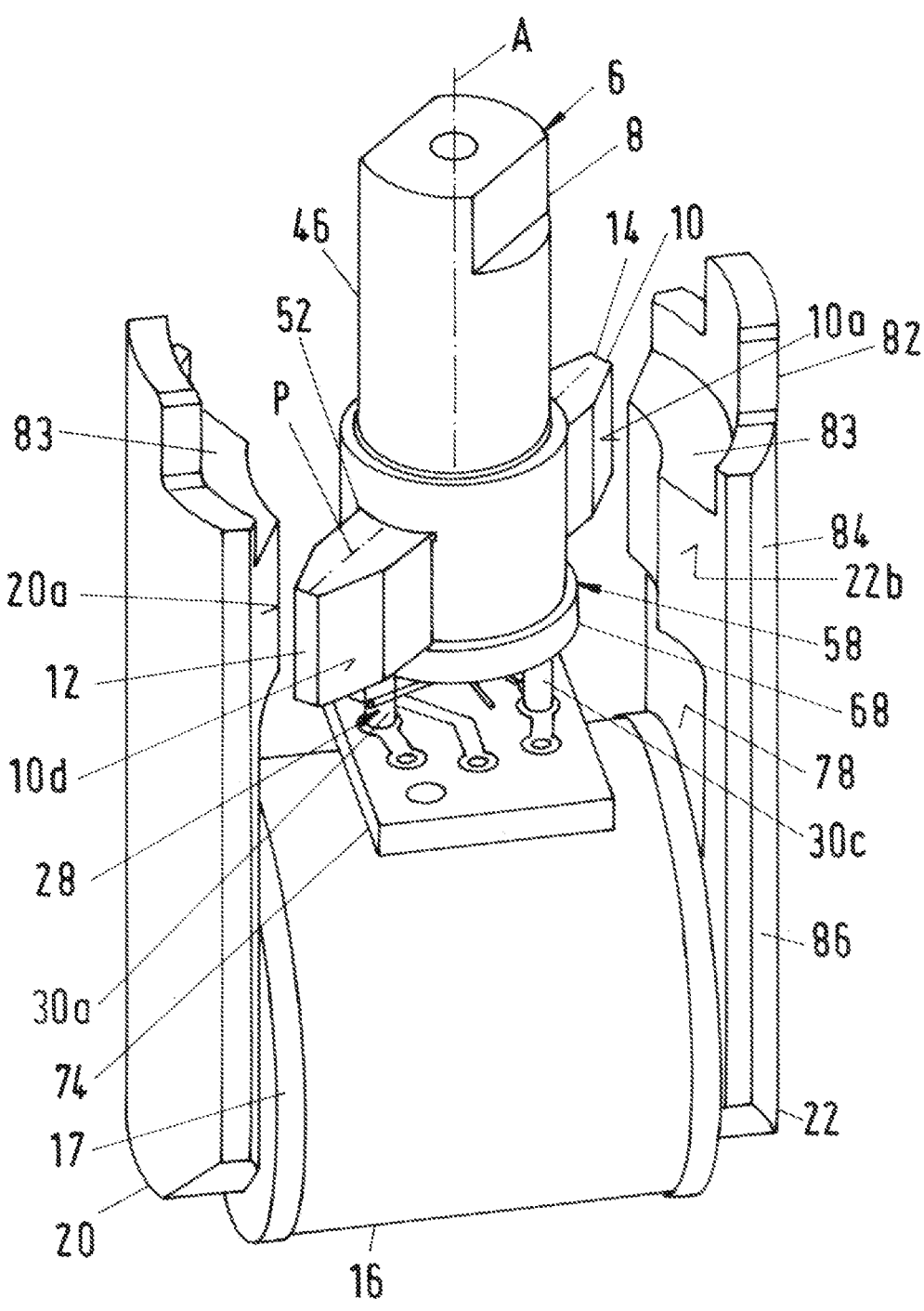
FIG. 4 shows a perspective view of selected components of the rotary magnet from FIG. 1.

The contact spring 28 made of strip material is designed as H-shaped in longitudinal section and is designed as X-shaped in cross section, in relation to the assembly position. Therefore, four spring arms 28a, 28b, 28c, 28d result, which have identical spring arm lengths L and are aligned perpendicularly to the axis of rotation A. Moreover, the four spring arms 28a, 28b, 28c, 28d extend in different radial directions R, as FIGS. 3 and 6 show, wherein the adjacent spring arms 28a and 28c, as well as 28b and 28d each have an angular distance of 70° to one another.

Figure 5:
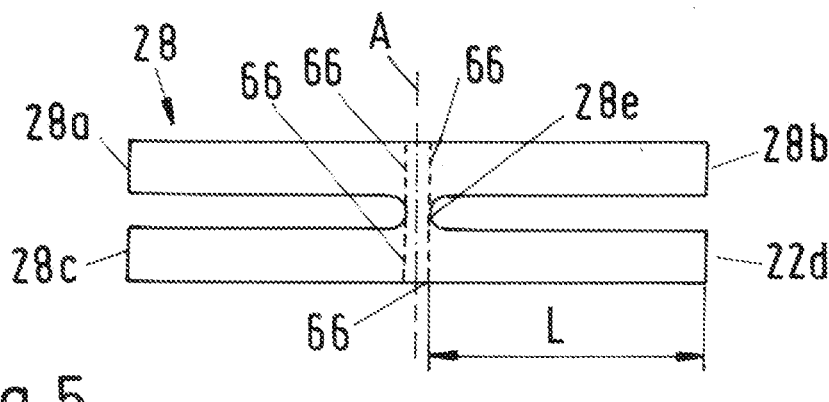
FIG. 5 shows a view of a contact spring.

The contact spring 28 is integrally formed, wherein it can receive the X-shape by bending, for example. For this purpose, the spring arms 28a, 28b, 28c, 28d can be bent or folded in the circumferential direction in relation to a base 28e of the contact spring 28, so that a bending line 66 forms between each spring arm 28a, 28b, 28c, 28d and the base 28e. The X-shape thus has the result that the spring arms 28a, 28b, 28c, 28d and the base 28e enclose an angle in each case. The base 28e is formed by the cross stroke of the H-shape, as FIG. 5 shows. This figure moreover shows that the spring arms 28a, 28b, 28c, 28d and the base 28e are designed as rectangular and planar viewed in longitudinal section.

Figure 6:
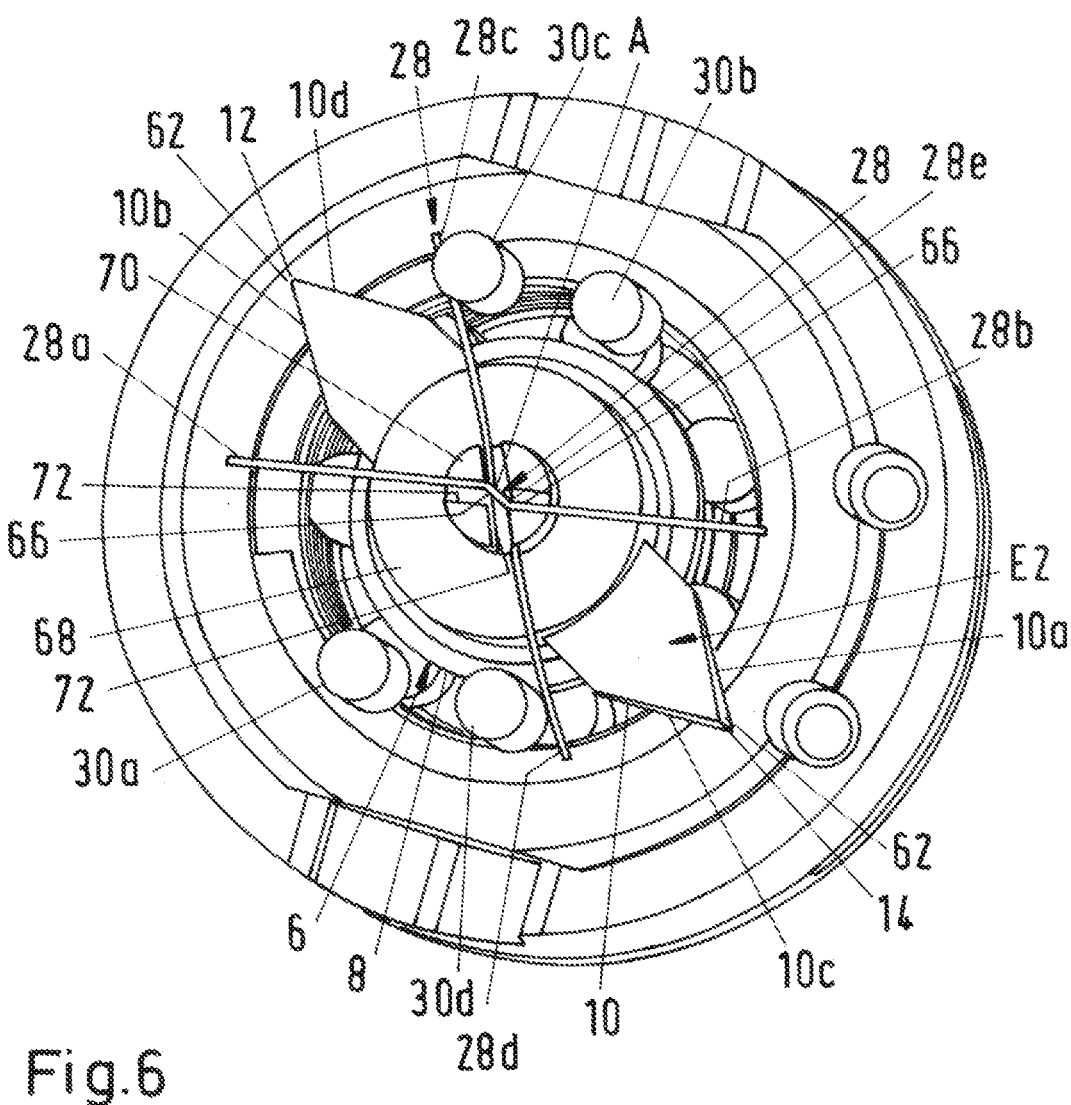
FIG. 6 shows a perspective view of a rotary magnet.

As FIG. 6 shows, in the end position E2, the spring arms 28c and 28d press against the contact pins 30c and 30d, by which the spring arms 28c and 28d are elastically bent. A pre-tension is introduced into the spring arms 28c and 28d in this way. The spring holder 58 is a separate component and is fastened at the end on the rotor shaft 46 via its disc base 68. The spring holder 58 comprises the cylindrical disc base 68 and a holding mandrel 70 protruding therefrom in the axial direction X and centrally with respect to the axis of rotation A. The holding mandrel 70 includes two holding channels 72 extending in different radial directions R with respect to the axis of rotation A, which are formed at the free end of the holding mandrel 70. The holding channels 72 protrude continuously through the holding mandrel 70. The contact spring 28 is held in the two holding channels 72.

The contact pins 30a, 30b, 30c, 30d are all held on a circuit board 74, wherein a single one of the four spring arms 28a, 28b, 28c, 28d is assigned to each of the contact pins 30a, 30b, 30c, 30d, because of which each of the spring arms 28a, 28b, 28c, 28d can press against only a single one of the contact pins 30a, 30b, 30c, 30d and vice versa. Each of the contact pins 30a, 30b, 30c, 30d forms a contact pair with its assigned spring arm 28a, 28b, 28c, 28d, so that four contact pairs 28a/30a, 28b/30b, 28c/30c, 28d/30d result. Each of the two end positions E1, E2 is assigned two of the contact pairs. In the first end position E1, the spring arms 28a and 28b contact the corresponding contact pins 30a and 30b and thus close a circuit which is assigned to the end position E1. The remaining spring arms 28c and 28d are not in contact with the corresponding contact pins 30c and 30d.

In the second end position E2, in contrast, the spring arms 28c and 28d contact the corresponding contact pins 30c and 30d and thus close a circuit which is assigned to the end position E2. The remaining spring arms 28a and 28b are not in contact with the corresponding contact pins 30a and 30b.

FIG. 1 shows that the contact pins 30a, 30b, 30c, 30d have equal radial distances to the axis of rotation A.

In FIG. 6, the permanent magnet 10 is not illustrated as trapezoidal at the ends, but triangular. There is thus also no longer an end face 60. Rather, the triangle forms an end edge 62, which extends in the axial direction X and in parallel to the axis of rotation D. The end edge 62 can also lie on the imaginary rotational circle 32.

To avoid repetitions, differences from FIGS. 2 and 3 are to be described hereinafter of FIGS. 8 and 9. Features which are not described are so to speak to be considered disclosed and described.

Figure 8:
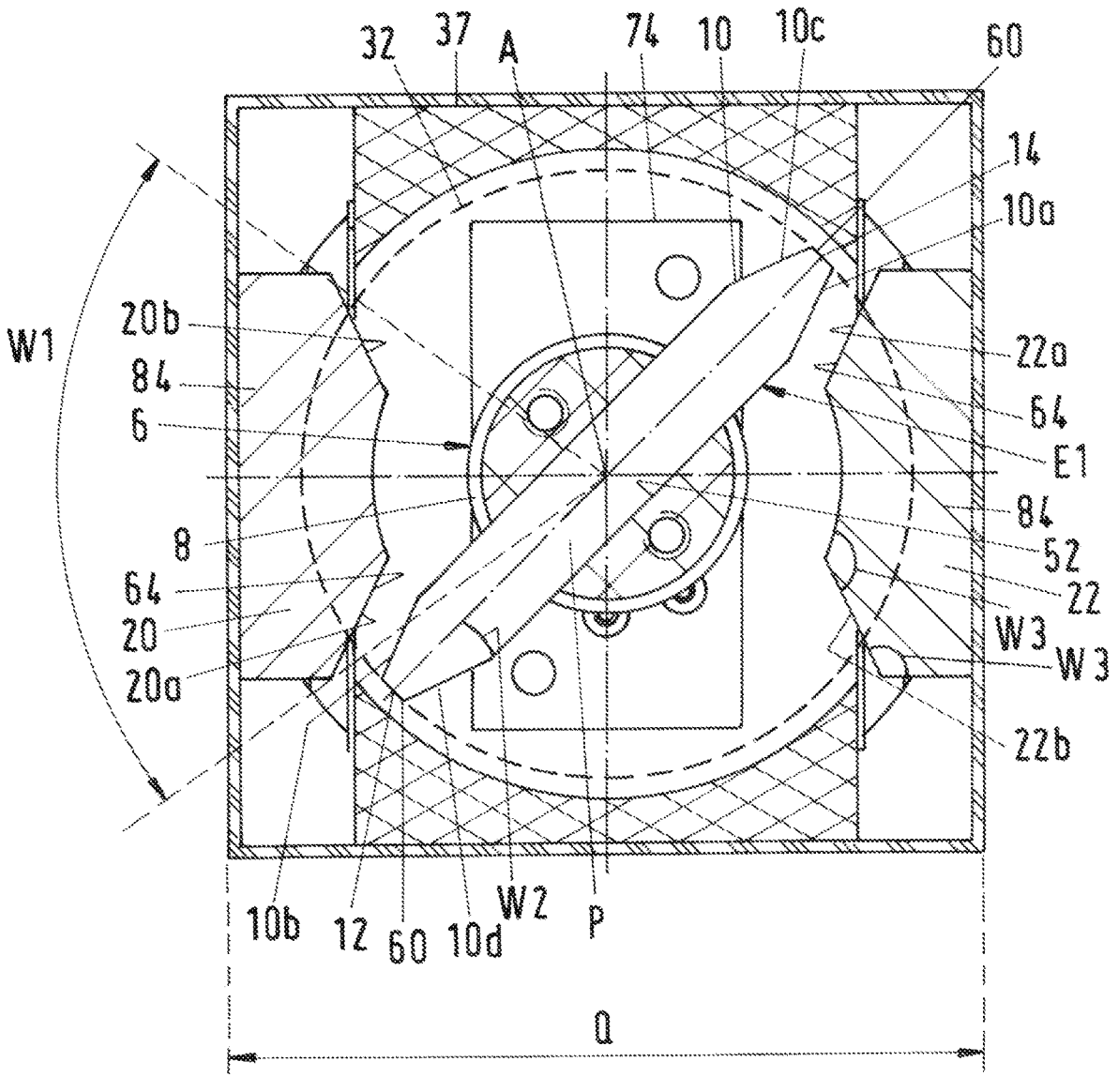
FIG. 8 shows a cross-sectional view of a rotary magnet analogous to FIG. 2.
Figure 9:
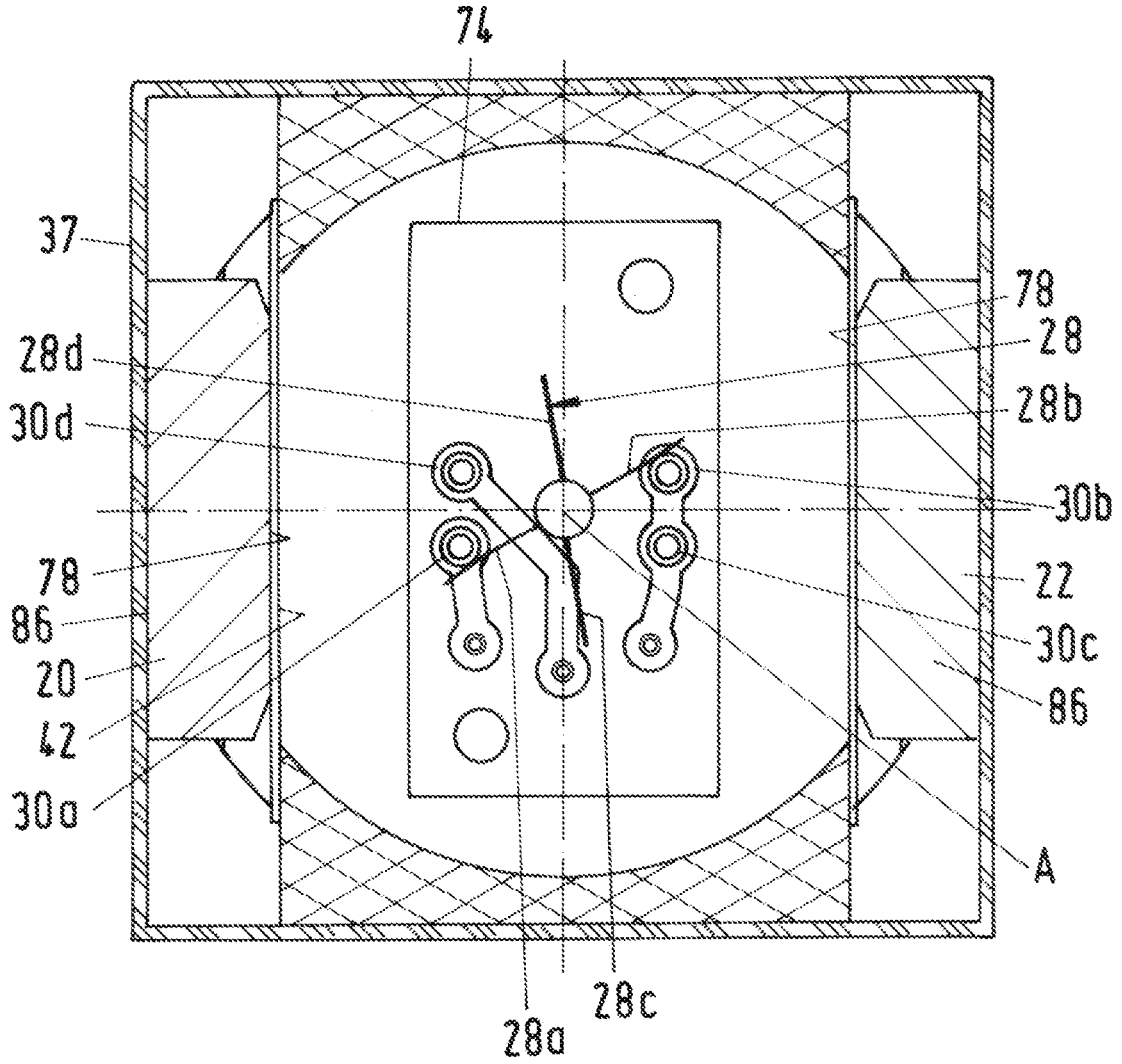
FIG. 9 shows a cross-sectional view of a rotary magnet analogous to FIG. 3.

FIGS. 8 and 9 do not show a cylindrical housing sleeve 36, as depicted in FIGS. 2 and 3, rather a rectangular housing sleeve 37. Housing base and housing cover can also so to speak be designed as rectangular in cross section. The sections of FIGS. 8 and 9 are guided on a corresponding rotary magnet at points of section which correspond to the points of section of FIGS. 2 and 3 on the rotary magnet 2. The housing sleeve 37 now no longer has a diameter or external diameter, rather a transverse extension Q.

The invention is not restricted to one of the above-described embodiments, but rather may be modified in a variety of ways. All features and advantages arising from the claims, the description, and the drawing, including constructive details, spatial arrangements, and method steps, can be part of the invention in varying combinations.

All combinations made up of at least two features disclosed in the description, the claims, and/or the figures fall within the scope of the invention.

To avoid repetitions, features disclosed according to the device are also to be disclosed and able to be claimed with respect to the method. Features disclosed according to the method are also to be disclosed and able to be claimed with respect to the device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A bistable rotary magnet, comprising:
a stator and a rotor rotatable around an axis of rotation, wherein the rotor comprises a rotor shaft and a bar-shaped permanent magnet connected thereto in a rotationally fixed manner, having differently polarized magnetic poles opposed with respect to the axis of rotation, wherein the stator comprises two pole shoes extending along the axis of rotation, wherein the bar-shaped permanent magnet is adjustable between the pole shoes alternately between a first end position and a second end position, wherein the bar-shaped permanent magnet includes a first pole surface and a second pole surface at each magnetic pole and each of the two pole shoes includes a first pole surface and a second pole surface, wherein in the first end position the first pole surfaces of the permanent magnet are aligned in parallel to the adjacent first pole surfaces of the pole shoes and in the second end position the second pole surfaces of the permanent magnet are aligned in parallel to the adjacent second pole surfaces of the pole shoes; and
a coil for conducting electric current, wherein the coil is arranged between the pole shoes on a yoke; and
an end position sensor comprising a contact spring connected in a rotationally-fixe manner to the rotor shaft;
wherein the contact spring has at least one spring arm and at least one contact pin against which the at least one spring arm presses,
wherein the contact spring comprises four spring arms.

2. The bistable rotary magnet according to claim 1, wherein the ends of the permanent magnet are trapezoidal.

3. The bistable rotary magnet according to claim 1, wherein the ends of the permanent magnet are triangular.

4. The bistable rotary magnet according to claim 1, wherein a largest-diameter imaginary rotational circle on which the permanent magnet can move extends through the two pole shoes.

5. The bistable rotary magnet according to claim 1, further comprising:
a mechanical rotational angle limit stop for the rotor, wherein the mechanical rotational angle limit stop includes a stop recess extending in a circumferential direction with respect to the axis of rotation and at least one stop pin arranged in the stop recess.

6. The bistable rotary magnet according to claim 5, wherein one of the stop recess and the stop pin is arranged rotationally fixed with the rotor and another of the stop recess and the stop pin is arranged fixed on a housing.

7. The bistable rotary magnet according to claim 1, designed to apply force to the permanent magnet in a direction of one of the end positions by energizing the coil.

8. The bistable rotary magnet according to claim 7, wherein the coil is energized in pulsed operation.

9. The bistable rotary magnet according to claim 1, wherein the at least one contact pin comprises four contact pins, wherein a single one of the four spring arms is assigned to each of the four contact pins.

10. The bistable rotary magnet according to claim 1, wherein the contact spring is arranged or designed such that it is pre-tensioned by a magnetic field between permanent magnet and corresponding pole shoe in at least one of the end positions.

* * * * *